(12) United States Patent
Oh et al.

(10) Patent No.: US 12,438,195 B2
(45) Date of Patent: Oct. 7, 2025

(54) NON-AQUEOUS ELECTROLYTE, AND LITHIUM SECONDARY BATTERY COMPRISING THE SAME

(71) Applicant: LG Energy Solution, Ltd., Seoul (KR)

(72) Inventors: Jeong Woo Oh, Daejeon (KR); Chul Haeng Lee, Daejeon (KR); Yu Ha An, Daejeon (KR); Sung Guk Park, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 592 days.

(21) Appl. No.: 17/872,361

(22) Filed: Jul. 25, 2022

(65) Prior Publication Data
US 2023/0088739 A1  Mar. 23, 2023

(30) Foreign Application Priority Data
Jul. 29, 2021 (KR) .................. 10-2021-0100129

(51) Int. Cl.
| | |
|---|---|
| *H01M 10/0568* | (2010.01) |
| *H01M 4/02* | (2006.01) |
| *H01M 4/04* | (2006.01) |
| *H01M 4/485* | (2010.01) |
| *H01M 4/505* | (2010.01) |
| *H01M 4/525* | (2010.01) |
| *H01M 10/0525* | (2010.01) |
| *H01M 10/0567* | (2010.01) |
| *H01M 10/0569* | (2010.01) |
| *H01M 50/46* | (2021.01) |

(52) U.S. Cl.
CPC ..... *H01M 10/0568* (2013.01); *H01M 4/0404* (2013.01); *H01M 4/485* (2013.01); *H01M 4/505* (2013.01); *H01M 4/525* (2013.01); *H01M 10/0525* (2013.01); *H01M 10/0567* (2013.01); *H01M 10/0569* (2013.01); *H01M 50/46* (2021.01); *H01M 2004/028* (2013.01); *H01M 2300/0028* (2013.01)

(58) Field of Classification Search
CPC ......... H01M 10/056; H01M 10/0567; H01M 10/0568; H01M 10/0569; H01M 50/46; H01M 4/02; H01M 2004/028; H01M 4/485; H01M 4/505; H01M 4/525; H01M 10/0525
See application file for complete search history.

(56) References Cited

U.S. PATENT DOCUMENTS

| | | |
|---|---|---|
| 2005/0064294 A1 | 3/2005 | Lim et al. |
| 2011/0229769 A1* | 9/2011 | Ihara .............. H01M 10/0525 429/325 |
| 2013/0004861 A1* | 1/2013 | Yu .................. C07C 255/16 429/339 |
| 2014/0227612 A1 | 8/2014 | Abe et al. |
| 2017/0025709 A1 | 1/2017 | Schmidt |
| 2017/0104238 A1 | 4/2017 | Abe et al. |
| 2017/0104239 A1 | 4/2017 | Abe et al. |
| 2017/0288268 A1* | 10/2017 | Kim .............. H01M 10/0569 |
| 2017/0309962 A1 | 10/2017 | Abe et al. |
| 2017/0317386 A1 | 11/2017 | Abe et al. |
| 2017/0346127 A1 | 11/2017 | Zhang et al. |
| 2018/0198165 A1 | 7/2018 | Abe et al. |
| 2018/0316061 A1 | 11/2018 | Kuroda et al. |
| 2019/0081356 A1 | 3/2019 | Abe et al. |
| 2020/0028211 A1 | 1/2020 | Morizur et al. |
| 2020/0044287 A1 | 2/2020 | Kim et al. |
| 2020/0087262 A1 | 3/2020 | Mallet et al. |

(Continued)

FOREIGN PATENT DOCUMENTS

| | | |
|---|---|---|
| EP | 100000 A1 | 7/2021 |
| JP | 2014150070 A | 8/2014 |

(Continued)

OTHER PUBLICATIONS

Katritzky, A. R. et al. Strategies toward the design or energetic ionic liquids: nitro- and nitril-substituted N, Nàâ dialkylimidazolium salts. New Journal of Chemistry. 30, 349-358 (Year: 2006).*
Smiglak, M. et al. Synthesis, limitations, and thermal properties of energetically-substituted, protonated imidazolium picrate and nitrate salts and further comparison with their methylated analogs. New Journal of Chemistry. 36, 702-722 (Year: 2012).*

(Continued)

*Primary Examiner* — Marla D McConnell
*Assistant Examiner* — Julia S Caserto
(74) *Attorney, Agent, or Firm* — Lerner David LLP

(57) ABSTRACT

The present invention relates to a non-aqueous electrolyte comprising a lithium salt; an organic solvent; and a compound represented by Chemical Formula 1, wherein the invention can control moisture in the lithium secondary battery in which the non-aqueous electrolyte is used, suppress by-product formation according to moisture control, and improve the durability of the solid electrolyte layer, thereby improving the durability thereof,

[Chemical Formula 1]

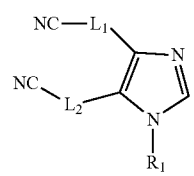

wherein $L_1$ and $L_2$ are each independently a single bond or an alkylene group having 1 to 5 carbon atoms, and $R_1$ is hydrogen or an alkyl group having 1 to 5 carbon atoms.

16 Claims, No Drawings

(56) References Cited

U.S. PATENT DOCUMENTS

| | | |
|---|---|---|
| 2020/0365901 A1 | 11/2020 | Sugawara et al. |
| 2020/0411908 A1 | 12/2020 | Kuroda et al. |
| 2021/0147604 A1 | 5/2021 | Daigle et al. |
| 2022/0140391 A1 | 5/2022 | Kim et al. |
| 2022/0166066 A1 | 5/2022 | Schmidt |
| 2022/0231339 A1 | 7/2022 | Oh et al. |

FOREIGN PATENT DOCUMENTS

| | | |
|---|---|---|
| JP | 2015103408 A | 6/2015 |
| JP | 2017191677 A | 10/2017 |
| JP | 2018156761 A | 10/2018 |
| KR | 20050029778 A | 3/2005 |
| KR | 20130003583 A | 1/2013 |
| KR | 20160132961 A | 11/2016 |
| KR | 20170056699 A | 5/2017 |
| KR | 20190100952 A | 8/2019 |
| KR | 20200027985 A | 3/2020 |
| KR | 20200054097 A | 5/2020 |
| KR | 20200092310 A | 8/2020 |
| KR | 20200105227 A | 9/2020 |
| KR | 20210026500 A | 3/2021 |
| KR | 102270869 B1 | 7/2021 |
| WO | 2020175907 A1 | 9/2020 |
| WO | 2020234538 A1 | 11/2020 |

OTHER PUBLICATIONS

Kee Sung Han et al., "Effects of Anion Mobility on Electrochemical Behaviors of Lithium-Sulfur Batteries", Chemistry of Materials, Oct. 2017, 29, pp. 9023-9029.

Extended European Search Report including Written Opinion for Application No. 22849898.6 dated Jul. 24, 2025. 11 pages.

* cited by examiner

NON-AQUEOUS ELECTROLYTE, AND LITHIUM SECONDARY BATTERY COMPRISING THE SAME

CROSS-REFERENCE TO RELATED APPLICATIONS

The present application claims priority from Korean Patent Application No. 10-2021-0100129, filed on Jul. 29, 2021, the disclosure of which is incorporated herein by reference.

BACKGROUND OF THE INVENTION

The present invention relates to a non-aqueous electrolyte and a lithium secondary battery comprising the same.

In recent years, personal IT devices and computational networks have been developed due to the development of information society, and there has been a demand for development of battery technology for efficiently storing and utilizing electrical energy as overall society's dependence on electrical energy increases.

In particular, there is an interest in solving environmental problems and realizing a sustainable cyclic society, and studies of energy storage devices such as lithium ion batteries and electric double layer capacitors have been widely conducted. Among them, the lithium secondary battery is in the spotlight as it is a battery system with the highest theoretical energy density among battery technologies.

The lithium secondary battery is mainly configured of a positive electrode composed of a transition metal oxide containing lithium, a negative electrode capable of storing lithium, an electrolyte serving as a mediator for transmitting lithium ions, and a separation membrane. A double electrolyte has been known to have a large influence on the stability, safety, and the like of the battery, and many studies have been conducted on this.

In this regard, in general, as an electrolyte of a lithium secondary battery, a non-aqueous electrolyte including a lithium salt and an organic solvent is used, and the organic solvent is a carbonate-based organic solvent. At this time, as the lithium salt, $LiPF_6$ or the like can be used, and in the case of a $PF_6^-$ anion, which is vulnerable to heat, there is a problem in that when the battery is exposed to high temperature, a Lewis acid such as $PF_5$ is generated due to thermal decomposition of lithium salts. Lewis acids such as $PF_5$ cause decomposition of the organic solvent itself and cause a problem of an increase in resistance and a decrease in life of the lithium secondary battery by destroying the solid electrolyte interface layer (SEI layer) formed on the surface of the negative electrode active material.

Therefore, there is an urgent need to develop a non-aqueous electrolyte for a lithium secondary battery capable of improving lithium ion transport characteristics, electrochemical stability, battery durability, etc.

US Patent Publication No. 2018-0316061 discloses an amide-based electrolyte battery, but does not provide an alternative to the above-described problem.

RELATED ART DOCUMENT

Patent Document (Patent Document 1) US Patent Publication No. 2018-0316061 (published on 2018 Nov. 1)

BRIEF SUMMARY OF THE INVENTION

One object of the present disclosure is to provide a non-aqueous electrolyte capable of improving high-temperature storage stability and high-temperature lifespan characteristics of a lithium secondary battery.

In addition, another object of the present disclosure is to provide a lithium secondary battery including the above-described non-aqueous electrolyte.

The present disclosure provides a non-aqueous electrolyte including a lithium salt; an organic solvent; and a compound represented by the Chemical Formula 1.

[Chemical Formula 1]

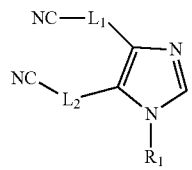

In Chemical Formula 1, $L_1$ and $L_2$ are each independently a single bond or an alkylene group having 1 to 5 carbon atoms, and $R_1$ is hydrogen or an alkyl group having 1 to 5 carbon atoms.

In addition, the present disclosure provides a lithium secondary battery including a negative electrode; a positive electrode facing the cathode; a separator interposed between the negative electrode and the positive electrode; and the above-described non-aqueous electrolyte.

The non-aqueous electrolyte according to the present disclosure includes a lithium salt; an organic solvent; and a compound represented by a specific Chemical Formula, and thus is characterized in that it can improve high-temperature storage characteristics and high-temperature lifespan characteristics of a lithium secondary battery. Specifically, the compound included in the non-aqueous electrolyte solution according to the present disclosure can play a role in removing the Lewis acid generated from the lithium salt when the lithium secondary battery is exposed to high temperatures, thus preventing the decomposition of the organic solvent caused by the Lewis acid generated from the lithium salt, the destruction of the negative electrode active material or the solid electrolyte interface layer (SEI layer) of the negative electrode. In addition, since the compound represented by the specific Chemical Formula has a low LUMO energy level, it can participate in the formation reaction of the SEI layer of the negative electrode, and thus the durability of the SEI layer of the negative electrode can be further improved.

Accordingly, the lithium secondary battery including the non-aqueous electrolyte can have improved high-temperature storage characteristics and high-temperature lifespan characteristics.

DETAILED DESCRIPTION OF THE INVENTION

Hereinafter, the present invention will be described in more detail to help the understanding of the present invention. At this time, the terms or words used in the specification and claims should not be interpreted as being limited to conventional or dictionary meanings, and the terms or words should be interpreted as a meaning and a concept that are consistent with the technical concept of the present invention based on the principle that the inventor can appropriately define the concepts of terms in order to explain his/her own invention in the best way.

In addition, in this specification, the terms "comprises," "includes," or "has" and the like are intended to designate the presence of the features, numbers, steps, components, or combinations thereof that are implemented, and are not to be understood as precluding the possibility of the presence or addition of one or more other features or numbers, steps, components or combinations thereof.

In the present specification, the alkyl group may be straight-chain or branched-chain. It may be optionally substituted. In the present specification, unless otherwise defined, "substituted" means that at least one hydrogen bonded to carbon is substituted with an element other than hydrogen, and for example, it means being substituted with an alkyl group having 1 to 5 carbon atoms or a fluorine element.

In the present specification, the average particle size ($D_{50}$) may be defined as a particle size corresponding to 50% of the cumulative volume in the particle size distribution curve of the particles. The average particle size ($D_{50}$) may be measured using, for example, a laser diffraction method. The laser diffraction method can generally measure a particle size from a submicron to mm region, and high reproducibility and high resolution results can be obtained.

Hereinafter, the non-aqueous electrolyte of the present invention and a lithium secondary battery including the same will be described in detail.

Non-Aqueous Electrolyte

The present disclosure provides a non-aqueous electrolyte. Specifically, the non-aqueous electrolyte may be a non-aqueous electrolyte for a lithium secondary battery.

Specifically, the non-aqueous electrolyte according to the present disclosure includes a lithium salt; an organic solvent; and a compound represented by the following Chemical Formula 1.

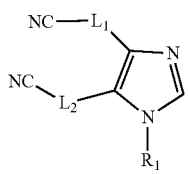

[Chemical Formula 1]

In Chemical Formula 1, $L_1$ and $L_2$ are each independently a single bond or an alkylene group having 1 to 5 carbon atoms, and $R_1$ is hydrogen or an alkyl group having 1 to 5 carbon atoms.

The non-aqueous electrolyte according to the present disclosure includes a lithium salt; an organic solvent; and a compound represented by a specific Chemical Formula, and thus is characterized in that it can improve high-temperature storage characteristics and high-temperature lifespan characteristics of a lithium secondary battery. Specifically, the compound included in the non-aqueous electrolyte solution according to the present disclosure may play a role in removing the Lewis acid generated from the lithium salt when the lithium secondary battery is exposed to high temperatures, thus preventing the decomposition of the organic solvent caused by the Lewis acid generated from the lithium salt, the destruction of the negative electrode active material or the solid electrolyte interface layer (SEI layer) of the negative electrode. In addition, since the compound represented by the specific Chemical Formula has a low LUMO energy level, it can participate in the formation reaction of the SEI layer of the negative electrode, and thus the durability of the SEI layer of the negative electrode can be further improved.

Accordingly, the lithium secondary battery including the non-aqueous electrolyte may have improved high-temperature storage characteristics and high-temperature lifespan characteristics.

(1) Lithium Salt

The non-aqueous electrolyte of the present disclosure includes a lithium salt. The lithium salt is used as an electrolyte salt in a lithium secondary battery, and is used as a medium for transferring lithium ions.

Typically, the lithium salt may include at least one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$ and specifically, $LiPF_6$ may be included in consideration of the ion transport characteristics and electrochemical stability of the electrolyte, but is not limited thereto. Meanwhile, the lithium salt may be used alone or as a mixture of two or more as needed.

The lithium salt may be included in the non-aqueous electrolyte at a concentration of 0.5M to 5M, preferably at a concentration of 0.5M to 4M. When the concentration of the lithium salt is within the above range, the concentration of lithium ions in the non-aqueous electrolyte is appropriate, so that charging and discharging of the battery can be performed properly, and the viscosity of the non-aqueous electrolyte is appropriate to improve wetting in the battery, thereby improving battery performance.

(2) Compound Represented by Chemical Formula 1

The non-aqueous electrolyte of the present disclosure includes a compound represented by the following Chemical Formula 1.

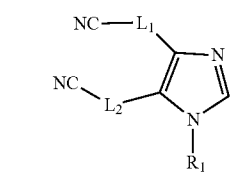

[Chemical Formula 1]

In Chemical Formula 1, $L_1$ and $L_2$ are each independently a single bond or an alkylene group having 1 to 5 carbon atoms, and $R_1$ is hydrogen or an alkyl group having 1 to 5 carbon atoms.

For example, when the lithium salt is $LiPF_6$, when the lithium salt is exposed to a high temperature, a Lewis acid such as PF5 may be formed due to thermal decomposition of the $PF_6^-$ anion. Since Lewis acids such as $PF_5$ may cause problems of decomposing the organic solvent in the lithium secondary battery or destroying the SEI layer formed on the negative electrode or negative electrode active material layer, the high temperature durability of the lithium secondary battery may be lowered.

In order to solve this problem, the non-aqueous electrolyte of the present disclosure is characterized in that it includes the compound represented by Chemical Formula 1 above. Since the compound represented by Chemical Formula 1 includes a functional group capable of performing the role of a Lewis base in the structure so that the removal of the Lewis acid formed from the lithium salt can be effectively made, the decomposition of the organic solvent is prevented, and damage to or destruction of the SEI layer of the negative electrode can be prevented. Therefore, the lithium secondary battery using the non-aqueous electrolyte of the present disclosure can be remarkably improved in high-temperature durability such as high-temperature storage characteristics and high-temperature lifespan characteristics.

Specifically, since the compound represented by Chemical Formula 1 has a pentagonal ring structure, the energy level of the lowest unoccupied molecular orbital (LUMO) is low, so it can be easily decomposed at the negative electrode. This allows the compound represented by Chemical Formula 1 to participate in the formation reaction of the SEI layer of the negative electrode, thereby contributing to the improvement of durability of the SEI layer.

In addition, due to the cyano group (—CN) of the compound represented by Chemical Formula 1, the effect of controlling moisture in the non-aqueous electrolyte may be improved.

In Chemical Formula 1, $L_1$ and $L_2$ may be each independently a single bond or an alkylene group having 1 to 5 carbon atoms, and specifically may be a single bond.

In Chemical Formula 1, $R_1$ may hydrogen or an alkyl group having 1 to 5 carbon atoms, and specifically, may be an alkyl group having 1 to 5 carbon atoms, and more specifically may be a methyl group in terms of further lowering the possibility of HF generation upon high temperature exposure.

Specifically, the compound represented by Chemical Formula 1 of the present invention may be a compound represented by the following Chemical Formula 1A.

[Chemical Formula 1A]

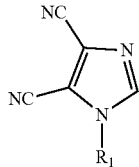

$R_1$ may be hydrogen or an alkyl group having 1 to 5 carbon atoms, specifically, an alkyl group having 1 to 5 carbon atoms, more specifically, a methyl group.

Meanwhile, the compound represented by Chemical Formula 1 may include at least one selected from the group consisting of a compound represented by Chemical Formula 2A and a compound represented by Chemical Formula 2B, and in this case, the moisture control effect of the cyano group may be further improved. Specifically, the compound represented by Chemical Formula 1 may include the compound represented by Chemical Formula 2B below, and in this case, it is possible to further improve high-temperature storage performance and high-temperature lifetime performance by further lowering the possibility of HF generation when exposed to high temperatures.

[Chemical Formula 2A]

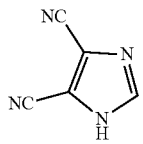

[Chemical Formula 2B]

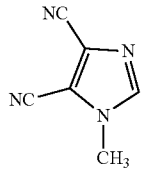

The compound represented by Chemical Formula 1 may be included in the non-aqueous electrolyte in an amount of 0.01 wt % to 7 wt %, specifically, 0.3 wt % to 4 wt %, and more specifically 1.5 wt % to 3.5 wt %, and when it is within the above ranges, the above-described effect of removing the Lewis acid generated from the lithium salt is sufficiently exhibited, and the high-temperature durability of the battery can be improved, which is preferable.

(3) Organic Solvent

The non-aqueous electrolyte according to the present disclosure includes an organic solvent. The organic solvent is a non-aqueous solvent commonly used in lithium secondary batteries, and is not particularly limited as long as its decomposition due to an oxidation reaction or the like can be minimized in the charging/discharging process of the secondary battery.

Specifically, the organic solvent may include at least one selected from a linear carbonate, a cyclic carbonate, a linear ester, a cyclic ester, an ether, glyme, or a nitrile. The organic solvent may preferably include at least one selected from a linear carbonate or a cyclic carbonate, and more preferably include a linear carbonate and a cyclic carbonate. In particular, the existing non-aqueous electrolyte generally contains a cyclic carbonate as an organic solvent for a high dielectric constant, dissociation of lithium salts, etc., and the role of the cyclic carbonate used therein can be partially or totally replaced by the compound represented by the above-described Chemical Formula 1. Moreover, the compound represented by Chemical Formula 1 has high oxidation stability and excellent lithium ion transport performance, and does not generate gas by-products, thus improving the durability and lifespan characteristics of a lithium secondary battery, so that characteristics of a battery using such compound can be exhibited at a desirable level as compared with the battery using only a cyclic carbonate.

The linear carbonate may include at least one selected from the group consisting of dimethyl carbonate (DMC), diethyl carbonate (DEC), dipropyl carbonate, ethyl methyl carbonate (EMC), methyl propyl carbonate, and ethyl propyl carbonate.

The cyclic carbonate may include at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC).

Specific examples of the linear ester include, but are not limited to, methyl acetate, ethyl acetate, propyl acetate, methyl propionate, ethyl propionate, propyl propionate, and butyl propionate.

Specific examples of the cyclic ester include, but are not limited to, γ-butyrolactone, γ-valerolactone, γ-caprolactone, σ-valerolactone, ε-caprolactone, etc.

Specific examples of the ether include, but are not limited to, dimethyl ether, diethyl ether, dipropyl ether, methylethyl ether, methylpropyl ether, ethylpropyl ether, 1,3-dioxolane (DOL) and 2,2-bis(trifluoromethyl))-1,3-dioxolane (TFDOL), etc.

Specific examples of the glyme include, but are not limited to, dimethoxyethane (glyme, DME), diethoxyethane, digylme, triglyme, and tetraglyme (TEGDME).

Specific examples of the nitrile include, but are not limited to, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzo nitrile, difluorobenzonitrile, trifluorobenzonitrile, phenylacetonitrile, 2-fluorophenylacetonitrile, 4-fluorophenylacetonitrile, etc.

When the organic solvent includes the linear carbonate and the cyclic carbonate, a volume ratio of the linear carbonate and the cyclic carbonate may be 20:80 to 80:20, specifically 25:75 to 50:50.

(4) Additive

The non-aqueous electrolyte may further include an additive.

Specifically, the non-aqueous electrolyte may further include at least one additive selected from the group consisting of vinylene carbonate, vinyl ethylene carbonate, propane sultone, succinonitrile, adiponitrile, ethylene sulfate, propene sultone, fluoroethylene carbonate, $LiPO_2F_2$, lithium difluorooxalatoborate (LiODFB), lithium bis-(oxalato)borate (LiBOB), 3-trimethoxysilanyl-propyl-N)-aniline (TMSPa), and tris(trimethylsilyl)phosphite (TMSPi), and specifically, may further include an additive including vinylene carbonate. When the additive is included in the non-aqueous electrolyte, it is preferable in terms of forming a stable SEI layer on the negative electrode, thereby suppressing an additional decomposition reaction of the electrolyte and improving the lifespan characteristics.

The additive may be included in the non-aqueous electrolyte in an amount of 0.1 wt % to 15 wt %, preferably 0.3 wt % to 5 wt %.

When the above-described additive is included in the non-aqueous electrolyte, the weight ratio of the compound represented by Chemical Formula 1 and the additive may be 0.1:1 to 11:1, specifically 3:1 to 9:1, and when it is within the above range, the high-temperature performance improvement effect by the combined use of the compound represented by Chemical Formula 1 and the additive may be preferably implemented.

Lithium Secondary Battery

In addition, the present disclosure provides a lithium secondary battery including the above-described non-aqueous electrolyte.

Specifically, the lithium secondary battery according to the present disclosure includes a negative electrode; a positive electrode facing the negative electrode; a separator facing the negative electrode and the positive electrode; and the above-described non-aqueous electrolyte.

In this case, the lithium secondary battery of the present disclosure may be manufactured according to a conventional method known in the art. For example, the lithium secondary battery of the present disclosure can be manufactured as follows: after a positive electrode, a separator between the positive and negative electrodes, and a negative electrode are sequentially stacked to form an electrode assembly, the electrode assembly is inserted into the battery case, and the non-aqueous electrolyte according to the present disclosure is injected.

The negative electrode may include a negative electrode current collector; and a negative electrode active material layer disposed on at least one surface of the negative electrode current collector.

The negative electrode current collector is not particularly limited as long as it has high conductivity without causing a chemical change in the battery. Specifically, copper, stainless steel, aluminum, nickel, titanium, calcined carbon, copper or stainless steel whose surface is treated with carbon, nickel, titanium, silver, etc., an aluminum-cadmium alloy, etc. may be used as the negative electrode current collector.

The negative electrode current collector may typically have a thickness of 3 to 500 μm.

Fine irregularities may be formed on a surface of the negative electrode current collector to strengthen the bonding strength of the negative electrode active material. For example, the negative electrode current collector may be used in various forms such as a film, a sheet, a foil, a net, a porous body, a foam, a nonwoven body, etc.

The negative electrode active material layer is disposed on at least one side of the negative electrode current collector. Specifically, the negative active material layer may be disposed on one side or both sides of the negative electrode current collector.

The negative electrode active material layer may include a negative electrode active material.

The negative electrode active material is a material capable of reversibly intercalating/deintercalating lithium ions, and may include at least one selected from the group consisting of a carbon-based active material, a (semi) metal-based active material, and a lithium metal, and specifically, and may include at least one selected from a carbon-based active material or a (semi) metal-based active material.

The carbon-based active material may include at least one selected from the group consisting of artificial graphite, natural graphite, hard carbon, soft carbon, carbon black, graphene, and fibrous carbon, preferably may include at least one selected from the group consisting of artificial graphite and natural graphite.

The average particle size ($D_{50}$) of the carbon-based active material may be 10 μm to 30 μm, preferably 15 μm to 25 μm, for the purpose of maintaining structural stability during charging and discharging and reducing side reactions with the electrolyte.

Specifically, the (semi) metal-based active material may include at least one (semi) metal selected from the group consisting of Cu, Ni, Na, K, Rb, Cs, Fr, Be, Mg, Ca, Sr, Si, Sb, Pb, In, Zn, Ba, Ra, Ge, Al, V, Ti, and Sn; an alloy of at least one (semi) metal selected from the group consisting of Cu, Ni, Na, K, Rb, Cs, Fr, Be, Mg, Ca, Sr, Si, Sb, Pb, In, Zn, Ba, Ra, Ge, Al, V, Ti, and Sn and lithium; an oxide of at least one (semi) metal selected from the group consisting of Cu, Ni, Na, K, Rb, Cs, Fr, Be, Mg, Ca, Sr, Si, Sb, Pb, In, Zn, Ba, Ra, Ge, Al, V, Ti, and Sn; lithium titanium oxide (LTO); lithium vanadium oxide; etc.

More specifically, the (semi) metal-based active material may include a silicon-based active material.

The silicon-based active material may include a compound represented by $SiO_x$ ($0 \leq x < 2$). In the case of $SiO_2$, since lithium cannot be stored because it does not react with lithium ions, x is preferably within the above range, and more preferably, the silicon-based oxide may be SiO.

The average particle size ($D_{50}$) of the silicon-based active material may be 1 μm to 30 μm, preferably 2 μm to 15 μm, for the purpose of maintaining structural stability during charging and discharging and reducing side reactions with the electrolyte.

The negative active material may be included in the negative electrode active material layer in an amount of 60 wt % to 99 wt %, preferably 75 wt % to 95 wt %.

The negative electrode active material layer may further include a binder and/or a conductive material together with the negative electrode active material.

The binder is used to improve battery performance by improving adhesion between the negative electrode active material layer and the negative electrode current collector, for example, may include at least one selected from the group consisting of a polyvinylidene fluoride-hexafluoropropylene copolymer (PVDF-co-HFP), polyvinylidene fluoride (PVDF), polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, polyacrylic acid, an ethylene-propylene-diene monomer (EPDM), a sulfonated EPDM, styrene butadiene rubber (SBR), fluororubber, and a material in which hydrogen is substituted with Li, Na or Ca, and may also include various copolymers thereof.

The binder may be included in the negative electrode active material layer in an amount of 0.5 wt % to 10 wt %, preferably 1 wt % to 5 wt %.

The conductive material is not particularly limited as long as it has conductivity without causing a chemical change in the battery, for example, graphite such as natural graphite or artificial graphite; carbon black, such as acetylene black, Ketjen black, channel black, furnace black, lamp black, and summer black; conductive fibers such as carbon fibers and metal fibers; conductive tubes such as carbon nanotubes; fluorocarbons; metal powders such as aluminum and nickel powder; conductive whiskers such as zinc oxide and potassium titanate; conductive metal oxides such as titanium oxide; and conductive materials such as polyphenylene derivatives may be used.

The conductive material may be included in the negative electrode active material layer in an amount of 0.5 wt % to 10 wt %, preferably 1 wt % to 5 wt %.

The thickness of the negative active material layer may be 10 μm to 100 μm, preferably 50 μm to 80 μm.

The negative electrode may be manufactured by coating a negative electrode slurry including a negative electrode active material, a binder, a conductive material and/or a solvent for forming the negative electrode slurry on at least one surface of the negative electrode current collector, followed by drying and rolling.

The solvent for forming a negative electrode slurry may include for example, at least one selected from the group consisting of distilled water, N-methyl-2-pyrrolidone (NMP), ethanol, methanol, and isopropyl alcohol, preferably distilled water, for the purpose of facilitating the dispersion of the negative electrode active material, the binder and/or the conductive material. The solid content of the negative electrode slurry may be 30 wt % to 80 wt %, specifically 40 wt % to 70 wt %.

The positive electrode faces the negative electrode.

The positive electrode may include a positive electrode current collector; and a positive electrode active material layer disposed on at least one surface of the positive electrode current collector.

The positive electrode current collector is not particularly limited as long as it has high conductivity without causing a chemical change in the battery. Specifically, the positive electrode current collector may include at least one selected from the group consisting of copper, stainless steel, aluminum, nickel, titanium, calcined carbon, and an aluminum-cadmium alloy, preferably aluminum.

The thickness of the positive electrode current collector may typically be 3 to 500 μm.

Fine irregularities may be formed on a surface of the positive electrode current collector to strengthen the bonding strength of the positive electrode active material. For example, the positive electrode current collector may be used in various forms such as a film, a sheet, a foil, a net, a porous body, a foam, a nonwoven body, etc.

The positive electrode active material layer is disposed on at least one side of the positive electrode current collector. Specifically, the positive active material layer may be disposed on one side or both sides of the positive electrode current collector.

The positive electrode active material layer may include a positive electrode active material.

The positive electrode active material is a compound capable of reversibly intercalating/deintercalating lithium, and specifically, may include a lithium transition metal composite oxide including lithium and at least one transition metal consisting of nickel, cobalt, manganese and aluminum; preferably, lithium and a lithium transition metal composite oxide including nickel, cobalt, and manganese.

For example, as the lithium transition metal composite oxides, lithium-manganese-based oxides (for example, $LiMnO_2$, $LiMn_2O_4$, etc.), lithium-cobalt-based oxides (for example, $LiCoO_2$, etc.), lithium-nickel-based oxides (for example, $LiNiO_2$, etc.), lithium-nickel-manganese-based oxides (for example, $LiNi_{1-Y}Mn_YO_2$ (where, $0<Y<1$), $LiMn_{2-Z}Ni_ZO_4$ (where, $0<Z<2$), etc.), lithium-nickel-cobalt-based oxides (for example, $LiNi_{1-Y1}Co_{Y1}O_2$ (where $0<Y1<1$), etc.), lithium-manganese-cobalt-based oxides (for example, $LiCo_{1-Y2}Mn_{Y2}O_2$ (where $0<Y2<1$), $LiMn_{2-z1}Co_{z1}O_4$ (wherein, $0<Z1<2$), etc.), lithium-nickel-manganese-cobalt-based oxides (for example, $Li(Ni_p Co_q Mn_{r1})O_2$ (where, $0<p<1$, $0<q<1$, $0<r1<1$, $p+q+r1=1$) or $Li(Ni_{p2}Co_{q2}Mn_{r3}M_{S2})O_2$ (where, $0<p1<2$, $0<q1<2$, $0<r2<2$, $p1+q1+r2=2$), etc.), or lithium-nickel-cobalt-transition metal (M) oxides (for example, $Li(Ni_{p2}Co_{q2}Mn_{r3}M_{S2})O_2$ (where M is selected from the group consisting of Al, Fe, V, Cr, Ti, Ta, Mg and Mo, and p2, q2, r3 and s2 are atomic fractions of each independent element, $0<p2<1$, $0<q2<1$, $0<r3<1$, $0<s2<1$, $p2+q2+r3+s2=1$), etc.) may be used, and any one or two or more compounds may be included. Among them, for the purpose of enhancing the capacity characteristics and stability of the battery, the lithium transition metal composite oxide may be $LiCoO_2$, $LiMnO_2$, $LiNiO_2$, lithium nickel-manganese-cobalt oxides (for example, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$, etc.), or lithium nickel cobalt aluminum oxides (for example, $Li(Ni_{0.8}Co_{0.15}Al_{0.05})O_2$, etc.), and taking into consideration the remarkable effect of improvement by controlling the type and content ratio of the constituent elements forming the lithium transition metal composite oxide, the lithium transition metal composite oxide may be $Li(Ni_{0.6}Mn_{0.2}Co_{0.2})O_2$, $LnNi_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$, etc., and any one of these or a mixture of two or more may be used.

More specifically, the positive electrode active material may be a lithium transition metal composite oxide, and may contain 60 mol % or more of nickel, based on the total number of moles of transition metals included in the lithium transition metal composite oxide. Specifically, the positive electrode active material is a lithium transition metal composite oxide, and the transition metal includes nickel, and at least one selected from manganese, cobalt, or aluminum, and may include nickel in an amount of 60 mol % or more, specifically 60 mol % to 90 mol %, based on the total number of moles of the transition metal. When the lithium transition metal composite oxide using such a high nickel content is used together with the above-described non-aqueous electrolyte, it is preferable for the purpose of reducing by-products in the gas phase generated by structural collapse.

In addition, the positive electrode active material may include a lithium composite transition metal oxide represented by the following Chemical Formula 5:

$$Li_{1+x}(Ni_aCo_bMn_cM_d)O_2 \quad \text{[Chemical Formula 5]}$$

In Chemical Formula 5, M is at least one selected from W, Cu, Fe, V, Cr, Ti, Zr, Zn, Al, In, Ta, Y, La, Sr, Ga, Sc, Gd, Sm, Ca, Ce, Nb, Mg, B or Mo, and 1+x, a, b, c and d are each independent atomic fractions of elements, $0 \leq x \leq 0.2$, $0.50 \leq a < 1$, $0 < b \leq 0.25$, $0 < c \leq 0.25$, $0 \leq d \leq 0.1$, $a+b+c+d=1$.

Preferably, a, b, c and d may be $0.70 \leq a \leq 0.95$, $0.025 \leq b \leq 0.20$, $0.025 \leq c \leq 0.20$, $0 \leq d \leq 0.05$, respectively.

Preferably, a, b, c and d may be $0.80 \leq a \leq 0.95$, $0.025 \leq b \leq 0.15$, $0.025 \leq c \leq 0.15$, $0 \leq d \leq 0.05$, respectively.

Preferably, a, b, c and d may be $0.85 \leq a \leq 0.90$, $0.05 \leq b \leq 0.10$, $0.05 \leq c \leq 0.10$, $0 \leq d \leq 0.03$, respectively.

The positive active material may be included in an amount of 80 wt % to 99 wt %, preferably 92 wt % to 98.5 wt % in the positive electrode active material layer in consideration of the sufficient capacity of the positive electrode active material.

The positive electrode active material layer may further include a binder and/or a conductive material together with the above-described positive electrode active material.

The binder is a component that assists in the binding of the active material and the conductive material and the binding to the current collector, specifically can include at least one selected from the group consisting of polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene terpolymer (EPDM), a sulfonated EPDM, styrene-butadiene rubber and fluororubber, preferably polyvinylidene fluoride.

The binder may be included in an amount of 1 wt % to 20 wt %, preferably 1.2 wt % to 10 wt % in the positive electrode active material layer for the purpose of sufficiently securing the binding force between components such as the positive electrode active material.

The conductive material may be used to assist and improve conductivity in the secondary battery, and is not particularly limited as long as it has conductivity without causing a chemical change. Specifically, the positive electrode conductive material may include at least one selected the group consisting of graphite such as natural graphite or artificial graphite; carbon black, such as acetylene black, Ketjen black, channel black, furnace black, lamp black, and summer black; conductive fibers such as carbon fibers and metal fibers; conductive tubes such as carbon nanotubes; fluorocarbons; metal powders such as aluminum and nickel powder; conductive whiskers such as zinc oxide and potassium titanate; conductive metal oxides such as titanium oxide; and conductive materials such as polyphenylene derivatives, preferably carbon black for the purpose of improving conductivity.

The conductive material may be included in an amount of 1 wt % to 20 wt %, preferably 1.2 wt % to 10 wt %, in the positive electrode active material layer for the purpose of sufficiently securing electrical conductivity.

The thickness of the positive electrode active material layer may be 30 μm to 400 μm, preferably 40 μm to 110 μm.

The positive electrode may be manufactured by coating a positive electrode slurry including a positive electrode active material and optionally a binder, a conductive material, and a solvent for forming a positive electrode slurry on the positive electrode current collector, followed by drying and rolling.

The solvent for forming a positive electrode slurry may include an organic solvent such as N-methyl-2-pyrrolidone (NMP). The solid content of the positive electrode slurry may be 40 wt % to 90 wt %, specifically 50 wt % to 80 wt %.

The separator is interposed between the positive electrode and the negative electrode.

The separator separates the negative electrode and the positive electrode and provides a passage for lithium ions to move, and can be used without particular limitation as long as it is normally used as a separator in a lithium secondary battery, and in particular, it is preferable to use an electrolyte that has a low resistance to ion movement and an excellent electrolyte impregnating ability. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or a laminated structure including two or more of these layers may be used. In addition, a conventional porous nonwoven fabric, for example, a nonwoven fabric made of high melting point glass fiber, polyethylene terephthalate fiber, etc. may be used. In addition, a coated separator including a ceramic component or a polymer material may be used to secure heat resistance or mechanical strength, and may optionally be used in a single-layer or multi-layer structure.

The external shape of the lithium secondary battery of the present disclosure is not particularly limited, and may be, for example, a cylindrical shape, a square shape, a pouch shape, a coin shape, etc.

The lithium secondary battery according to the present disclosure may be used in a battery cell used as a power source of a small device, or may also be used as a unit cell of a medium or large battery module including a plurality of battery cells.

The lithium secondary battery according to the present disclosure is usefully used in the field of portable devices such as mobile phones, notebook computers, and digital cameras, and electric vehicles such as hybrid electric vehicles (HEVs) and electric vehicles (EVs).

In addition, the present disclosure provides a battery module including the lithium secondary battery as a unit cell, and a battery pack including the battery module.

The battery module or battery pack can be used as a power source for a medium or large device selected from the group consisting of a power tool; an electric vehicle; a hybrid electric vehicle; and a system for power storage.

Hereinafter, the present invention will be described in more detail through specific examples. However, the following examples are only examples to help the understanding of the present invention, and do not limit the scope of the present invention. It is obvious to those skilled in the art that various changes and modifications are possible within the scope and spirit of the present disclosure, and it goes without saying that such variations and modifications fall within the scope of the appended claims.

EXAMPLES

Example 1: Preparation of Non-Aqueous Electrolyte

LiPF$_6$ as a lithium salt, ethylene carbonate (EC) and ethyl methyl carbonate (EMC) mixed in a volume ratio of 30:70 as an organic solvent, and a compound represented by the following Chemical Formula 2A, and vinylene carbonate as an additive were mixed to prepare a non-aqueous electrolyte.

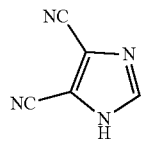

[Chemical Formula 2A]

The lithium salt was included at a molar concentration of 1.0M. The compound represented by Chemical Formula 2A was included in an amount of 0.5 wt % in the non-aqueous electrolyte. The vinylene carbonate was included in an amount of 0.5 wt % in the non-aqueous electrolyte.

Example 2: Preparation of Non-Aqueous Electrolyte

A non-aqueous electrolyte was prepared in the same manner as in Example 1, except that the compound represented by Chemical Formula 2A was included in an amount of 3 wt % in the non-aqueous electrolyte.

Example 3: Preparation of Non-Aqueous Electrolyte

A non-aqueous electrolyte was prepared in the same manner as in Example 1, except that the compound represented by Chemical Formula 2A was included in an amount of 0.1 wt % in the non-aqueous electrolyte.

Example 4: Preparation of Non-Aqueous Electrolyte

A non-aqueous electrolyte was prepared in the same manner as in Example 1, except that the compound represented by Chemical Formula 2A was included in an amount of 5 wt % in the non-aqueous electrolyte.

Example 5: Preparation of Non-Aqueous Electrolyte

A non-aqueous electrolyte was prepared in the same manner as in Example 1, except that the compound represented by the following Chemical Formula 2B was included instead of the compound represented by the Chemical Formula 2A.

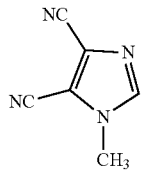

[Chemical Formula 2B]

Example 6: Preparation of Non-Aqueous Electrolyte

A non-aqueous electrolyte was prepared in the same manner as in Example 5, except that the compound represented by Chemical Formula 2B was included in an amount of 3 wt % in the non-aqueous electrolyte.

Example 7: Preparation of Non-Aqueous Electrolyte

A non-aqueous electrolyte was prepared in the same manner as in Example 5, except that the compound represented by Chemical Formula 2B was included in an amount of 5 wt % in the non-aqueous electrolyte.

Example 8: Preparation of Non-Aqueous Electrolyte

A non-aqueous electrolyte was prepared in the same manner as in Example 2, except that vinylene carbonate was not included.

Comparative Example 1: Preparation of Non-Aqueous Electrolyte

A non-aqueous electrolyte was prepared in the same manner as in Example 1, except that the compound represented by Chemical Formula 2A was not included in the non-aqueous electrolyte.

Comparative Example 2: Preparation of Non-Aqueous Electrolyte

A non-aqueous electrolyte was prepared in the same manner as in Example 1, except that the compound represented by the following Chemical Formula 3 (cis-1,2-dicyanoethylene) was included instead of the compound represented by the Chemical Formula 2A.

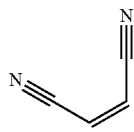

[Chemical Formula 3]

Comparative Example 3: Preparation of Non-Aqueous Electrolyte

A non-aqueous electrolyte was prepared in the same manner as in Example 2, except that the compound represented by the above Chemical Formula 3 was included instead of the compound represented by the Chemical Formula 2A.

Comparative Example 4

A non-aqueous electrolyte was prepared in the same manner as in Example 1, except that the compound represented by the following Chemical Formula 4 was included instead of the compound represented by the Chemical Formula 2A.

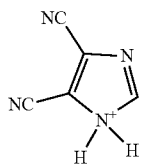

[Chemical Formula 4]

Comparative Example 5

A non-aqueous electrolyte was prepared in the same manner as in Example 2, except that the compound represented by the above Chemical Formula 4 was included instead of the compound represented by the Chemical Formula 2A.

TABLE 1

| | Non-aqueous electrolyte | | | | |
|---|---|---|---|---|---|
| | Lithium salt | | Dicyano compound | | Vinylene carbonate |
| | (LiPF$_6$) Molar concentration (mol/L) | Organic solvent Type | Type | wt % (based on non-aqueous electrolyte) | wt % (based on non-aqueous electrolyte) |
| Example 1 | 1 | EC and EMC (30:70 volume ratio) | Chemical Formula 2A | 0.5 | 0.5 |
| Example 2 | 1 | EC and EMC (30:70 volume ratio) | Chemical Formula 2A | 3 | 0.5 |
| Example 3 | 1 | EC and EMC (30:70 volume ratio) | Chemical Formula 2A | 0.1 | 0.5 |
| Example 4 | 1 | EC and EMC (30:70 volume ratio) | Chemical Formula 2A | 5 | 0.5 |
| Example 5 | 1 | EC and EMC (30:70 volume ratio) | Chemical Formula 2B | 0.5 | 0.5 |
| Example 6 | 1 | EC and EMC (30:70 volume ratio) | Chemical Formula 2B | 3 | 0.5 |
| Example 7 | 1 | EC and EMC (30:70 volume ratio) | Chemical Formula 2B | 5 | 0.5 |
| Example 8 | 1 | EC and EMC (30:70 volume ratio) | Chemical Formula 2A | 3 | — |
| Comparative Example 1 | 1 | EC and EMC (30:70 volume ratio) | — | — | 0.5 |
| Comparative Example 2 | 1 | EC and EMC (30:70 volume ratio) | Chemical Formula 3 | 0.5 | 0.5 |
| Comparative Example 3 | 1 | EC and EMC (30:70 volume ratio) | Chemical Formula 3 | 3 | 0.5 |
| Comparative Example 4 | 1 | EC and EMC (30:70 volume ratio) | Chemical Formula 4 | 0.5 | 0.5 |
| Comparative Example 5 | 1 | EC and EMC (30:70 volume ratio) | Chemical Formula 4 | 3 | 0.5 |

Experimental Example

Experimental Example 1: Measurement of Negative Electrode Reduction Potential

A coin-type half cell of Example 1 was manufactured in a conventional manner using a graphite electrode as a working electrode, lithium metal as a counter electrode, and the non-aqueous electrolyte of Example 1.

Further, the coin-type half cells of Examples 2 to 8 and Comparative Examples 1 to 5 were manufactured in the same manner as in the manufacturing method of Example 1, except that non-aqueous electrolytes of Examples 2 to 8 and Comparative Examples 1 to 5 were used instead of the non-aqueous electrolyte of Example 1, respectively.

For the coin-type half cells of Examples 1 to 8 and Comparative Examples 1 to 5, cyclic voltammetry was performed between 3V and 0V at a scan rate of 1 mA, and the reduced peak voltages measured therefrom are shown in Table 2 below.

TABLE 2

| | Experimental Example 1 Negative electrode reduction potential (V) |
|---|---|
| Example 1 | 2.3 |
| Example 2 | 2.3 |
| Example 3 | 2.3 |
| Example 4 | 2.3 |
| Example 5 | 2.2 |
| Example 6 | 2.2 |
| Example 7 | 2.2 |
| Example 8 | 2.2 |
| Comparative Example 1 | Not observed |
| Comparative Example 2 | Not observed |
| Comparative Example 3 | Not observed |
| Comparative Example 4 | 2.7 |
| Comparative Example 5 | 2.7 |

Referring to Table 2, it can be confirmed that the non-aqueous electrolytes of Examples 1 to 8 are reduced and decomposed at a lower potential. This means that the compound of Chemical Formula 1 may participate in the SEI film-forming reaction of the negative electrode and contribute to improving the durability of the battery.

Experimental Example 2: High-Temperature Cycle Capacity Retention Rate Evaluation <Manufacture of Secondary Battery>
1. Manufacture of Negative Electrode Artificial graphite as a negative electrode active material, carbon black (product name: Super C65, manufacturer: Timcal) as a conductive material, an acrylic binder (BM-L302, manufactured by Zeon) as a binder, and carboxymethyl cellulose as a thickener in a weight ratio of 95:1.5:2.3:1.2 were added to distilled water as a solvent for forming a negative electrode slurry to prepare a negative electrode slurry.

The negative electrode slurry was coated on one side of a copper current collector as a negative electrode current collector at a loading amount of 350 mg/25 cm$^2$, roll pressed, and dried in a vacuum oven at 130° C. for 10 hours to form a negative electrode active material layer as a negative electrode.

2. Manufacture of Positive Electrode

Li[Ni$_{0.86}$Co$_{0.05}$Mn$_{0.07}$Al$_{0.02}$]O$_2$ as a positive electrode active material, carbon black (product name: Super C65, manufacturer: Timcal) as a conductive material, and polyvinylidene fluoride (PVdF) as a binder in a weight ratio of 97.5:1.5:1.0 were added to N-methyl-2-pyrrolidone (NMP) as a solvent for forming a positive electrode slurry to prepare a positive electrode slurry.

The positive electrode slurry was coated on one side of a aluminum current collector as a positive electrode current collector at a loading amount of 607 mg/25 cm$^2$, roll pressed, and dried in a vacuum oven at 130° C. for 10 hours to form a positive electrode active material layer as a positive electrode.

3. Manufacture of Lithium Secondary Battery

A lithium secondary battery of Example 1 was manufactured by interposing a porous separator between the manufactured positive electrode and the negative electrode in a battery case, and then injecting the non-aqueous electrolyte prepared in Example 1.

Lithium secondary batteries of Examples 2 to 8 and Comparative Examples 1 to 5 were manufactured in the same manner as in the manufacturing method of the lithium secondary battery of Example 1, except that non-aqueous electrolytes of Examples 2 to 8 and Comparative Examples 1 to 5 were used instead of the non-aqueous electrolyte of Example 1, respectively.

<High-Temperature Cycle Capacity Retention Rate Evaluation>

Using the lithium secondary batteries of Examples 1 to 8 and Comparative Examples 1 to 5, high-temperature cycle capacity retention rates were evaluated.

Specifically, 300 cycles of charging and discharging were performed with one cycle of charging the lithium secondary batteries of Examples 1 to 8 and Comparative Examples 1 to 5 to 4.2V at 45° C. using an electrochemical charger and discharger under CC/CV, 0.33 C conditions, and then discharging to 3V at CC, 0.33 C conditions, and the capacity retention rate was measured.

The capacity retention rate was calculated by the following equation, and the results are shown in Table 3 below.

Capacity retention rate (%)=(discharge capacity after 300 cycles/discharge capacity after one cycle)×100

Experimental Example 3: High-Temperature Cycle Resistance Increase Rate Evaluation Lithium secondary batteries of Examples 1 to 8 and Comparative Examples 1 to 5 were prepared in the same manner as in Experimental Example 2.

300 cycles of charging and discharging were performed with one cycle of charging the lithium secondary batteries of Examples 1 to 8 and Comparative Examples 1 to 5 to 4.2V at 45° C. under CC/CV, 0.33 C conditions, and then discharging to 3V at CC, 0.33 C conditions.

After one cycle of charging and discharging, the discharge capacity after one cycle is measured using an electrochemical charger and discharger, the SOC is adjusted to 50% SOC, and a pulse of 2.5 C is applied for 10 seconds, and the initial resistance was calculated through the difference between the voltage before pulse application and the voltage after pulse application.

After 300 cycles of charging and discharging, the resistance after 300 cycles was calculated in the same manner as above, and the resistance increase rate was calculated using the following equation, and the results are shown in Table 3 below.

Resistance increase rate (%)=(resistance after 300 cycles−initial resistance)/initial resistance×100

Experimental Example 4: High-Temperature Cycle Volume Increase Rate Evaluation Lithium secondary batteries of Examples 1 to 8 and Comparative Examples 1 to 5 were prepared in the same manner as in Experimental Example 2.

The lithium secondary batteries of Examples 1 to 8 and Comparative Examples 1 to 5 were charged and discharged in the same manner as in Experimental Example 2 for 300 cycles. At this time, the volume (initial volume) of the lithium secondary battery before charging and discharging and the volume of the lithium secondary battery after 300 cycles were measured, and the volume increase rate was calculated by the following equation, and the results are shown in Table 3 below.

Volume increase rate (%)=(volume of lithium secondary battery after 300 cycles−initial volume)/initial volume×100

TABLE 3

|  | Experimental Example 2 Capacity retention rate [%] | Experimental Example 3 Resistance increase rate (%) | Experimental Example 4 Volume increase rate (%) |
| --- | --- | --- | --- |
| Example 1 | 95.2 | 3.5 | 3.1 |
| Example 2 | 95.7 | 2.3 | 2.8 |
| Example 3 | 94.7 | 5.1 | 4.5 |
| Example 4 | 93.7 | 7.5 | 5.8 |
| Example 5 | 98.6 | 0.8 | 1.2 |
| Example 6 | 99.2 | 0.5 | 0.5 |
| Example 7 | 97.5 | 1.5 | 1.8 |
| Example 8 | 94.5 | 4.7 | 3.6 |
| Comparative Example 1 | 81.2 | 17.9 | 23.2 |
| Comparative Example 2 | 82.5 | 15.4 | 19.5 |
| Comparative Example 3 | 82.9 | 15.1 | 18.3 |

TABLE 3-continued

|  | Experimental Example 2 Capacity retention rate [%] | Experimental Example 3 Resistance increase rate (%) | Experimental Example 4 Volume increase rate (%) |
|---|---|---|---|
| Comparative Example 4 | 91.1 | 10.4 | 14.5 |
| Comparative Example 5 | 92.8 | 9.8 | 12.1 |

Referring to Table 3, it can be confirmed that the lithium secondary batteries of Examples 1 to 8 using the non-aqueous electrolyte including the compound represented by Chemical Formula 1 have excellent high-temperature cycle lifespan performance compared to the lithium secondary batteries of Comparative Examples 1 to 5, the resistance increase rate according to the cycle is low, and the volume increase according to the cycle is small.

Experimental Example 5: Capacity Retention Rate Evaluation after High Temperature Storage Lithium secondary batteries of Examples 1 to 8 and Comparative Examples 1 to 5 were prepared in the same manner as in Experimental Example 2.

The lithium secondary batteries of Examples 1 to 8 and Comparative Examples 1 to 5 were initially charged and discharged by charging to 4.25V/55 mA at room temperature under 0.33 C/4.25V constant current/constant voltage (CC/CV) conditions, and discharging at 0.33 C to 2.5V, and then charged to 4.25V/55 mA under 0.33 C/4.25V constant current/constant voltage (CC/CV) conditions at room temperature, and then stored at 60° C. for 12 weeks. After storage, the secondary batteries were charged up to 4.25V/55 mA under 0.33 C/4.25V constant current/constant voltage (CC/CV) conditions at room temperature, and discharged to 2.5V at 0.33 C to measure the capacity at the time of discharging. The results are shown in Table 4 below.

Capacity retention rate (%)=(discharge capacity/initial discharge capacity after 12 weeks of storage)×100

Experimental Example 6: Evaluation of Resistance Increase Rate after High Temperature Storage Lithium secondary batteries of Examples 1 to 8 and Comparative Examples 1 to 5 were prepared in the same manner as in Experimental Example 2.

The lithium secondary batteries of Examples 1 to 8 and Comparative examples 1 to 5 were subjected to initial charging and discharging in the same manner as in Experimental Example 5, charged to SOC 50 based on a discharge capacity after capacity confirmation at room temperature, discharged at 3 C current for 10 seconds, and the resistance was measured by a voltage drop difference at this time to obtain an initial resistance, and measured by the same method after storage at 60° C. for 12 weeks to obtain a final resistance, whereby the resistance increase rate was calculated by the following formula. The results are shown in Table 4 below.

Resistance increase rate (%)=(final resistance−initial resistance)/(initial resistance)×100

Experimental Example 7: Evaluation of Volume Increase Rate after High Temperature Storage Lithium secondary batteries of Examples 1 to 8 and Comparative Examples 1 to 5 were prepared in the same manner as in Experimental Example 2.

The lithium secondary batteries of Examples 1 to 8 and Comparative Examples 1 and 5 were subjected to initial charging and discharging in the same manner as in Experimental Example 5, and the volume of each battery was measured by setting SOC 50 based on the discharge capacity, and this was defined as the initial volume, the volume measured after high-temperature storage at 60° C. for 12 weeks at a SOC of 100% was defined as the final volume, and the volume increase rate of the battery was calculated using the following formula. The results are shown in Table 4 below.

Volume increase rate (%)=(final volume−initial volume)/initial volume)×100

TABLE 4

|  | Experimental Example 5 Capacity retention rate (%) | Experimental Example 6 Resistance increase rate (%) | Experimental Example 7 Volume increase rate (%) |
|---|---|---|---|
| Example 1 | 79.5 | 27.5 | 25.7 |
| Example 2 | 80.2 | 26.1 | 23.1 |
| Example 3 | 78.1 | 30.2 | 27.8 |
| Example 4 | 81.3 | 24.1 | 19.7 |
| Example 5 | 97.2 | 2.1 | 2.5 |
| Example 6 | 98.5 | 1.6 | 2.1 |
| Example 7 | 95.9 | 2.7 | 3.7 |
| Example 8 | 83.7 | 12.1 | 10.7 |
| Comparative Example 1 | 37.5 | 79.2 | 80.5 |
| Comparative Example 2 | 51.4 | 54.3 | 57.7 |
| Comparative Example 3 | 52.1 | 57.6 | 55.1 |
| Comparative Example 4 | 63.2 | 43.4 | 40.5 |
| Comparative Example 5 | 65.0 | 41.0 | 38.1 |

Referring to Table 4, it can be confirmed that the lithium secondary batteries of Examples 1 to 8 using the non-aqueous electrolyte including the compound represented by Chemical Formula 1 have excellent high-temperature storage lifespan performance compared to the lithium secondary batteries of Comparative Examples 1 to 5, the resistance increase rate is low, and the volume increase is small.

Experimental Example 8: Measurement of Moisture Content in Electrolyte

A sample solution of Example 1A was prepared in which the compound represented by Chemical Formula 2A was included in an amount of 0.5 wt % in a solvent mixed with ethylene carbonate (EC) and ethyl methyl carbonate (EMC) in a volume ratio of 3:7.

The moisture content in the electrolyte was measured using a 756 Karl Fischer Coulometer instrument manufactured by Metrohm with the sample solution of Example 1A immediately after the addition of the compound represented by Chemical Formula 2A for 1 hour. After the measurement was performed three times, the average value of the electrolyte moisture content was taken as the electrolyte moisture content of the sample solution of Example 1A, and it is shown in Table 5 below.

The electrolyte moisture content was measured in the same manner as above except for using the sample solutions of Examples 2A to 7A and Comparative Examples 1A to 3A as described in Table 5, and the results are shown in Table 5 below.

TABLE 5

| | Sample solution | | | |
|---|---|---|---|---|
| | | Dicyano compound | | |
| | Solvent | Compound type | Content (wt %, based on the weight of the sample solution) | Electrolyte moisture content (ppm) |
| Example 1A | EC and EMC (30:70 volume ratio) | Chemical Formula 2A | 0.5 | 15 |
| Example 2A | EC and EMC (30:70 volume ratio) | Chemical Formula 2A | 3 | 10 |
| Example 3A | EC and EMC (30:70 volume ratio) | Chemical Formula 2A | 0.1 | 18 |
| Example 4A | EC and EMC (30:70 volume ratio) | Chemical Formula 2A | 5 | 8 |
| Example 5A | EC and EMC (30:70 volume ratio) | Chemical Formula 2B | 0.5 | 3 |
| Example 6A | EC and EMC (30:70 volume ratio) | Chemical Formula 2B | 3 | 2 |
| Example 7A | EC and EMC (30:70 volume ratio) | Chemical Formula 2B | 5 | 5 |
| Comparative Example 1A | EC and EMC (30:70 volume ratio) | — | — | 57 |
| Comparative Example 2A | EC and EMC (30:70 volume ratio) | Chemical Formula 3 | 0.5 | 54 |
| Comparative Example 3A | EC and EMC (30:70 volume ratio) | Chemical Formula 3 | 3 | 53 |

Referring to Table 5, it was confirmed that the sample solutions of Examples 1A to 7A containing the compound represented by Chemical Formula 1 had a very small amount of moisture in the electrolyte compared to the sample solutions of Comparative Examples 1A to 3A. This is because the ability of the compound represented by the Chemical Formula 1 to remove a Lewis acid is remarkably excellent, and therefore, when a non-aqueous electrolytic solution containing the compound of the Chemical Formula 1 is applied to a lithium secondary battery, the high temperature durability such as high temperature storage characteristics, high temperature life characteristics and the like of the lithium secondary batteries can be remarkably improved.

What is claimed is:

1. A non-aqueous electrolyte comprising:
a lithium salt;
an organic solvent; and
a compound represented by Chemical Formula 1, wherein

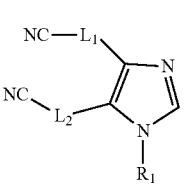

[Chemical Formula 1]

in Chemical Formula 1, $L_1$ and $L_2$ are each independently a single bond or an alkylene group having 1 to 5 carbon atoms, and
$R_1$ is hydrogen or an alkyl group having 1 to 5 carbon atoms,
provided when $L_1$ and $L_2$ are both a single bond, $R_1$ is an alkyl group having 1 to 5 carbon atoms.

2. The non-aqueous electrolyte of claim 1, wherein the compound represented by Chemical Formula 1 includes a compound represented by Chemical Formula 1A, wherein

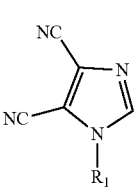

[Chemical Formula 1A]

in Chemical Formula 1A, $R_1$ is an alkyl group having 1 to 5 carbon atoms.

3. The non-aqueous electrolyte of claim 1, wherein the compound represented by Chemical Formula 1 comprises a compound represented by Chemical Formula 2B,

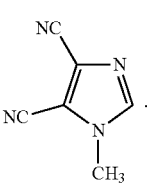

[Chemical Formula 2B]

4. The non-aqueous electrolyte of claim 1, wherein the compound represented by Chemical Formula 1 is comprised in an amount of 0.01 wt % to 7 wt % based on a total weight of the non-aqueous electrolyte.

5. The non-aqueous electrolyte of claim 1, wherein the compound represented by Chemical Formula 1 is comprised in an amount of 1.5 wt % to 3.5 wt % based on a total weight of the non-aqueous electrolyte.

6. The non-aqueous electrolyte of claim 1, wherein the lithium salt comprises at least one of $LiPF_6$, $LiBF_4$, $LiSbF_6$, $LiAsF_6$, $LiClO_4$, $LiN(C_2F_5SO_2)_2$, $LIN(CF_3SO_2)_2$, $CF_3SO_3L_1$, $LiC(CF_3SO_2)_3$, $LiC_4BO_8$, LiTFSI, or LiFSI.

7. The non-aqueous electrolyte of claim 1, wherein the lithium salt includes $LiPF_6$.

8. The non-aqueous electrolyte of claim 1, wherein the lithium salt is comprised at a concentration of 0.5 M to 5 M in the non-aqueous electrolyte.

9. The non-aqueous electrolyte of claim 1, wherein the organic solvent comprises at least one of a linear carbonate or a cyclic carbonate.

10. The non-aqueous electrolyte of claim 1, wherein the non-aqueous electrolyte further comprises at least one additive of vinylene carbonate, vinylethylene carbonate, propane sultone, succinonitrile, adiponitrile, ethylene sulfate, propene sultone, fluoroethylene carbonate, $LiPO_2F_2$, lithium difluorooxalatoborate (LiODFB), lithium bis-(oxalato) borate (LiBOB), 3-trimethoxysilanyl-propyl-N-aniline (TMSPa), or tris (trimethylsilyl) phosphite (TMSPi).

11. The non-aqueous electrolyte of claim 10, wherein the additive is vinylene carbonate.

12. The non-aqueous electrolyte of claim 10, wherein the additive is included in an amount of 0.1 wt % to 15 wt % based on a total weight of the non-aqueous electrolyte.

13. A lithium secondary battery comprising:
a negative electrode;
a positive electrode facing the negative electrode;
a separator interposed between the negative electrode and the positive electrode; and
the non-aqueous electrolyte of claim 1.

14. The lithium secondary battery of claim 12, wherein the positive electrode comprises a positive electrode current collector and a positive electrode active material layer disposed on at least one surface of the positive electrode current collector,
the positive electrode active material layer comprises a positive electrode active material, and
the positive electrode active material comprises a lithium composite transition metal oxide represented by Chemical Formula 5:

$Li_{1+x}(Ni_aCo_bMn_cM_d)O_2$      [Chemical Formula 5]

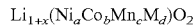

wherein in Chemical Formula 5,
M is one or more selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo,
1+x, a, b, c and d are each independent atomic fractions of the elements, and
0≤x≤0.2, 0.50≤a<1, 0<b≤0.25, 0<c≤0.25, 0≤d≤0.1, a+b+c+d=1.

15. The lithium secondary battery of claim 13, wherein a, b, c, and d of Chemical Formula 5 are 0.80≤a≤0.95, 0.025≤b≤0.15, 0.025≤c≤0.15, and 0≤d≤0.05, respectively.

16. A lithium secondary battery comprising:
a negative electrode;
a positive electrode facing the negative electrode;
a separator interposed between the negative electrode and the positive electrode; and
a non-aqueous electrolyte comprising:
a lithium salt,
an organic solvent, and
a compound represented by Chemical Formula 1,

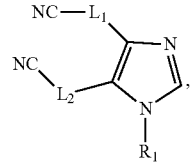

[Chemical Formula 1]

wherein, in Chemical Formula 1, $L_1$ and $L_2$ are each independently a single bond or an alkylene group having 1 to 5 carbon atoms, and $R_1$ is hydrogen or an alkyl group having 1 to 5 carbon atoms, provided when $L_1$ and $L_2$ are both a single bond, $R_1$ is an alkyl group having 1 to 5 carbon atoms, wherein the positive electrode comprises a positive electrode current collector
the positive electrode active material layer comprises a positive electrode active material, and
the positive electrode active material consists of a lithium composite transition metal oxide represented by Chemical Formula 5:

$Li_{1+x}(Ni_aCo_bMn_cM_d)O_2$      [Chemical Formula 5]

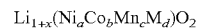

in Chemical Formula 5,
M is one or more selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo,
1+x, a, b, c and d are each independent atomic fractions of the elements, and
0≤x≤0.2, 0.50≤a<1, 0<b≤0.25, 0<c≤0.25, 0≤d≤0.1, a+b+c+d=1.

* * * * *